United States Patent
Luo et al.

(10) Patent No.: US 11,556,261 B2
(45) Date of Patent: Jan. 17, 2023

(54) MEMORY STRIPE CODING MANAGEMENT

(71) Applicant: Micron Technology, Inc., Boise, ID (US)

(72) Inventors: Ting Luo, Santa Clara, CA (US); Chun Sum Yeung, San Jose, CA (US); Xiangang Luo, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 237 days.

(21) Appl. No.: 16/994,213

(22) Filed: Aug. 14, 2020

(65) Prior Publication Data

US 2022/0050612 A1 Feb. 17, 2022

(51) Int. Cl.
*G06F 11/07* (2006.01)
*G06F 3/06* (2006.01)
*G06F 11/20* (2006.01)

(52) U.S. Cl.
CPC .......... *G06F 3/0644* (2013.01); *G06F 3/0619* (2013.01); *G06F 3/0688* (2013.01); *G06F 11/2094* (2013.01); *G06F 2201/82* (2013.01)

(58) Field of Classification Search
CPC ... G06F 11/2094; G06F 3/0619; G06F 3/0688
USPC ....................................................... 714/6.24
See application file for complete search history.

(56) References Cited

U.S. PATENT DOCUMENTS

| | | | |
|---|---|---|---|
| 9,443,616 B2 * | 9/2016 | Chen | G11C 29/44 |
| 11,175,984 B1 * | 11/2021 | Lercari | G06F 11/0784 |
| 2014/0231954 A1 | 8/2014 | Lue | |
| 2015/0287478 A1 * | 10/2015 | Chen | G11C 29/44 |
| | | | 714/719 |
| 2016/0085625 A1 * | 3/2016 | Amato | G06F 11/00 |
| | | | 714/766 |
| 2016/0179386 A1 | 6/2016 | Zhang | |
| 2016/0283143 A1 * | 9/2016 | Guo | G06F 11/108 |
| 2017/0249211 A1 * | 8/2017 | Hoei | G06F 3/0619 |
| 2018/0091172 A1 * | 3/2018 | Ilani | G06F 11/1068 |
| 2019/0163764 A1 * | 5/2019 | Ioannou | G06F 3/0608 |
| 2019/0339902 A1 * | 11/2019 | Yanes | G06F 3/0688 |

FOREIGN PATENT DOCUMENTS

WO 2017074570 A1 5/2017

OTHER PUBLICATIONS

Choudhuri, et al., "Performance Improvement of Block Based NAND Flash Translation Layer", retrieved from https://www.ics.uci.edu/~givargis/pubs/C32.pdf., Sep. 30-Oct. 3, 2007, 6 pages.

* cited by examiner

*Primary Examiner* — Chae M Ko
(74) *Attorney, Agent, or Firm* — Brooks, Cameron & Huebsch

(57) ABSTRACT

A method includes writing, to a first sub-set of memory blocks of a first plane associated with a memory device, first data corresponding to recovery of an uncorrectable error and writing, to a first sub-set of memory blocks of a second memory plane associated with the memory device, second data corresponding to recovery of the uncorrectable error. A relative physical location of the first sub-set of memory blocks of the first memory plane and a relative physical location of the first sub-set of memory blocks of the second memory plane are a same relative physical location with respect to the first memory plane and the second memory plane.

17 Claims, 5 Drawing Sheets

MEMORY STRIPE CODING MANAGEMENT

TECHNICAL FIELD

Embodiments of the disclosure relate generally to memory sub-systems, and more specifically, relate to memory stripe coding management for a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
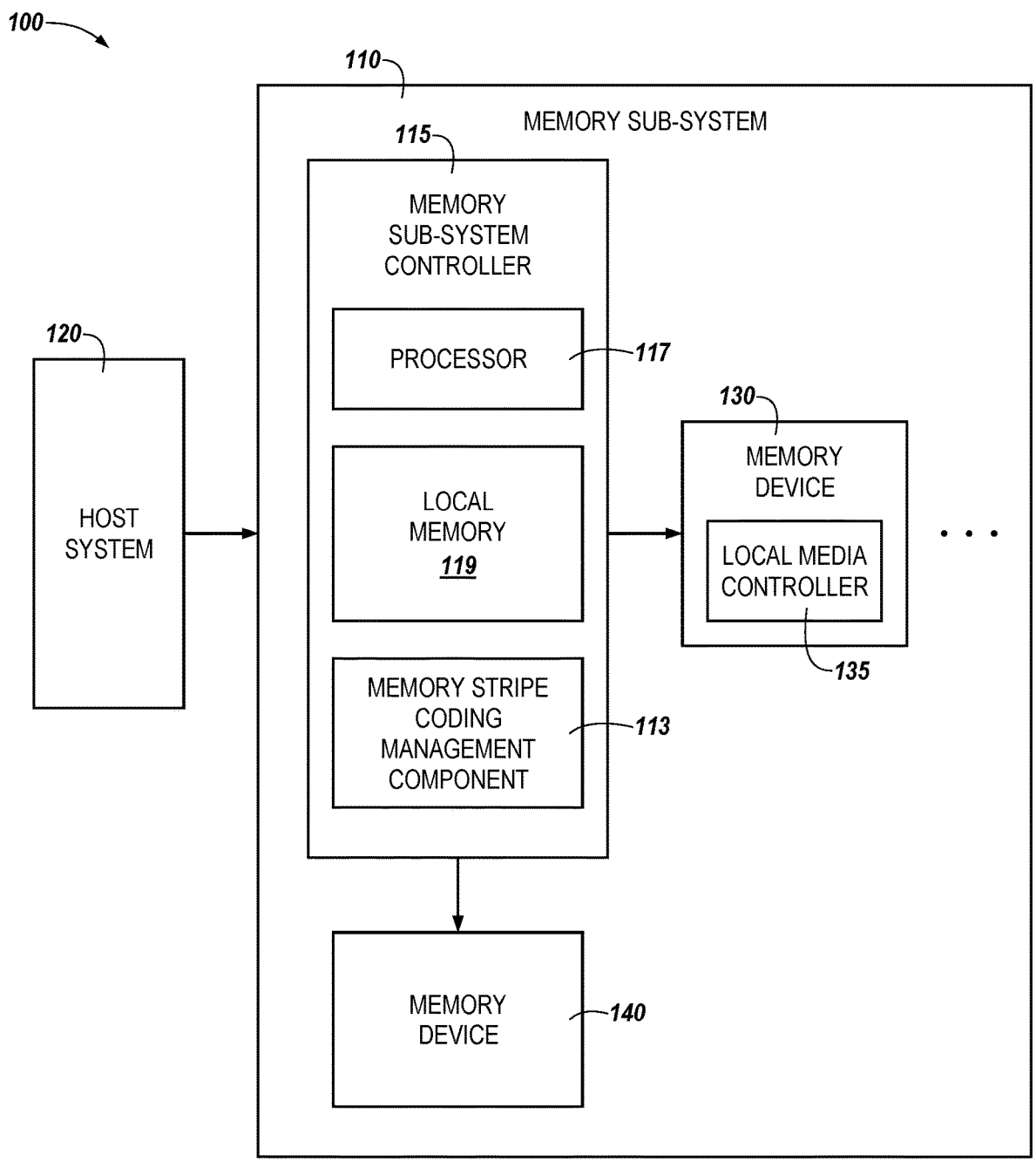
FIG. 1 illustrates an example computing system that includes a memory sub-system in accordance with some embodiments of the present disclosure.

Aspects of the present disclosure are directed to memory stripe coding management, in particular to memory sub-systems that include a memory stripe coding management component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

A memory sub-system can employ techniques to perform data recovery in the event of a memory defect associated with the programming of user data (e.g., data written by a host system) to a memory device of the memory sub-system. Conventionally, memory defects can be managed by a controller of the memory sub-system by generating parity data (e.g., exclusive-or (XOR) parity data) based on the written host data. The generated parity data (e.g., the XOR parity data) can be written by a controller to a cache memory (e.g., a volatile memory device such as a random access memory (RAM), dynamic random access memory (DRAM), or synchronous dynamic random access memory (SDRAM)) of the controller.

In many electronic devices (e.g., mobile devices) including electronic devices having an array of memory cells storing multiple bits per cell (e.g., quad-level cells (QLCs)), both multiple page (e.g., multi-page) parity protection and multiple plane (e.g., multi-plane) parity protection (e.g., protection for a failure of a memory device) is employed. In such systems, a large amount of cache memory storage space is required in order to store both multi-page parity data and multi-plane parity data. For example, for multi-page parity protection, 16 KB of parity data can be generated for each page line of the memory sub-system. In addition, a memory sub-system can have a multi-plane memory die (e.g., N planes) including multiple blocks of memory cells arranged in multiple planes (e.g., a multi-plane memory device) for which multi-plane parity protection can be employed. Each block can be divided into multiple sub-blocks that can each include multiple pages per block.

In general, major failures in a memory sub-system can invoke multiple word lines of the memory device and/or multiple planes of the memory device. Memory sub-systems having multiple planes (e.g., N planes per memory die) can require generation and storage of multi-plane parity data to enable protection against a multi-plane failure (e.g., a failure of some or all planes of the memory device). Similarly, memory sub-systems having multiple pages can require generation and storage of multi-page parity data to enable protection against a failure invoking multiple word lines of the memory device (e.g., a failure of some or all word lines of the memory device). However, protecting against both multi-word line failures and multi-plane failures can be difficult both in terms of an amount of memory space required to protect against both types of failures and in performance limitations associated with a memory sub-system.

In some approaches, for a multi-plane arrangement (e.g., a memory die having N planes), memory sub-systems can generate multi-plane parity data by executing an exclusive-or (XOR) operation based on the data written by the host system (also referred to as a resource value (R)) to multiple logical units (e.g., logical unit 1 to logical unit Y) of the memory sub-system. It is noted that each logical unit can include multiple planes (e.g., Plane 0, Plane 1, . . . , Plane N-1). The multi-plane parity data for each plane can be stored in cache memory of the controller. In some approaches, the controller executes an additional XOR operation on the data associated with all of the planes to generate multi-page parity data for each page (e.g., sub-block) or page line (e.g., word line). This multi-page parity can also be stored in cache memory of the controller.

For example, for a multi-plane memory die having N planes having two memory block sub-sets, 16 KB of parity data can be generated and stored for each plane. If each memory block sub-set includes 3 pages, then 48 KB of parity data can be generated and stored for each memory block sub-set across N planes. Furthermore, an additional sub-block of cache memory can be required for each memory block sub-set of the multi-plane memory in order to generate multi-plane parity data. For example, in a memory sub-system managing parity data for a multi-plane memory having 4 planes (e.g., N=4), a total controller cache memory requirement for one memory block sub-set of a multi-plane parity protection can be 96 KB per plane resulting in a cache memory requirement of 384 KB (e.g., 96 KB×4 planes). This represents a significant controller cache expenditure associated with some approaches to management of multi-page and multi-plane parity protection. Accordingly, there is a need to reduce expenditure of controller cache memory in connection with the storage of multi-page and/or multi-plane parity data used of the execution of a data recovery operation in the event of a loss of host written data.

In addition, given the storage limitations of some memory sub-systems, the parity data can, as memory resources become tied up, be written more frequently. This can lead to a write performance penalty being incurred by the memory sub-system in which more writes (and hence, more program-erase cycles) are incurred in order to protect the host written data. Accordingly, there is a need to reduce the quantity of program-erase cycles invoked in connection with the storage of multi-page and/or multi-plane parity data used of the execution of a data recovery operation in the event of a loss of host written data.

Aspects of the present disclosure address the above and other deficiencies by managing memory stripe coding such that multi-page and multi-plane parity protection can be provided within a shared stripe of parity data. As described in more detail, herein, the shared parity stripe can include redundant array of independent NAND (RAIN) recovery data. In some embodiments, the shared parity stripe can be coded such that, in contrast to approaches in which the same sub-blocks or pages are placed in different planes within a same RAIN stripe, different sub-blocks or pages are placed in different planes within a same RAIN stripe.

As described below, this can reduce the amount of memory resources required in some approaches to protect against failures that can lead to a loss of host written data. Further, such coding schemes can enable customizable parity data management based on failure schemes associated with a memory sub-system. In addition, embodiments described herein can be realized in the absence of firmware (or changes to firmware) to invoke different data recovery steps for different types of memory sub-system failures (e.g., multi-word line failures vs. multi-plane failures).

The term "RAIN," as used herein, is an umbrella term for computer information (e.g., data) storage schemes that divide and/or replicate (e.g., mirror) information among multiple pages of a memory sub-system, for instance, in order to help protect the data stored in the memory sub-system. A RAIN array may appear to a user and the operating system of a computing device as a single memory device (e.g., disk). RAIN can include striping (e.g., splitting) information so that different portions of the information are stored on different pages of the memory sub-system. The portions of the memory sub-system that store the split data can be collectively referred to as a stripe. As used herein, RAIN can also include mirroring, which can include storing duplicate copies of data on more than one page of more than one memory sub-system.

A RAIN stripe can include (e.g., be a combination of) user data and parity data. The parity data of the RAIN stripe, which can be referred to herein as the parity portion of the RAIN stripe, can include error protection data that can be used to protect user data stored in the memory sub-system against defects and/or errors that may occur during operation of the memory sub-system. For example, the RAIN stripe can protect user data stored in memory sub-system against defects and/or errors that may occur during operation of the memory sub-system, and can therefore provide protection against a failure of the memory sub-system.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a memory stripe coding management component 113. Although not shown in FIG. 1 so as to not obfuscate the drawings, the memory stripe coding management component 113 can include various circuitry to facilitate organization and selective writing of data (e.g., parity data) to particular pages of memory of a memory device 130, 140. For example, the memory stripe coding management component 113 can cause similar parity data (e.g., the data 338-1 to 338-7 described in connection with FIG. 3, herein) to be written to pages (e.g., the pages 238-1 to 238-M illustrated in FIG. 2, herein) that are located in physically different locations within planes (e.g., the planes 234-1 to 234-P illustrated in FIG. 2, herein) of a memory device 130, 140. In some embodiments, the memory stripe coding management component 113 can include special purpose circuitry in the form of an ASIC, FPGA, state machine, and/or other logic circuitry that can allow the memory stripe coding management component 113 to orchestrate and/or perform operations to perform memory stripe coding management operations for the memory device 130 and/or the memory device 140 as described herein.

In some embodiments, the memory sub-system controller 115 includes at least a portion of the memory stripe coding management component 113. For example, the memory sub-system controller 115 can include a processor 117 (processing device) configured to execute instructions stored in local memory 119 for performing the operations described herein. In some embodiments, the memory stripe coding management component 113 is part of the host system 110, an application, or an operating system.

In some embodiments, an apparatus (e.g., the computing system 100) can include a memory stripe coding management component 113. The memory stripe coding management component 113 can be resident on the memory sub-system 110. As used herein, the term "resident on" refers to something that is physically located on a particular component. For example, the memory stripe coding management component 113 being "resident on" the memory sub-system 110 refers to a condition in which the hardware circuitry that comprises the memory stripe coding management component 113 is physically located on the memory sub-system 110. The term "resident on" may be used interchangeably with other terms such as "deployed on" or "located on," herein.

Figure 2:
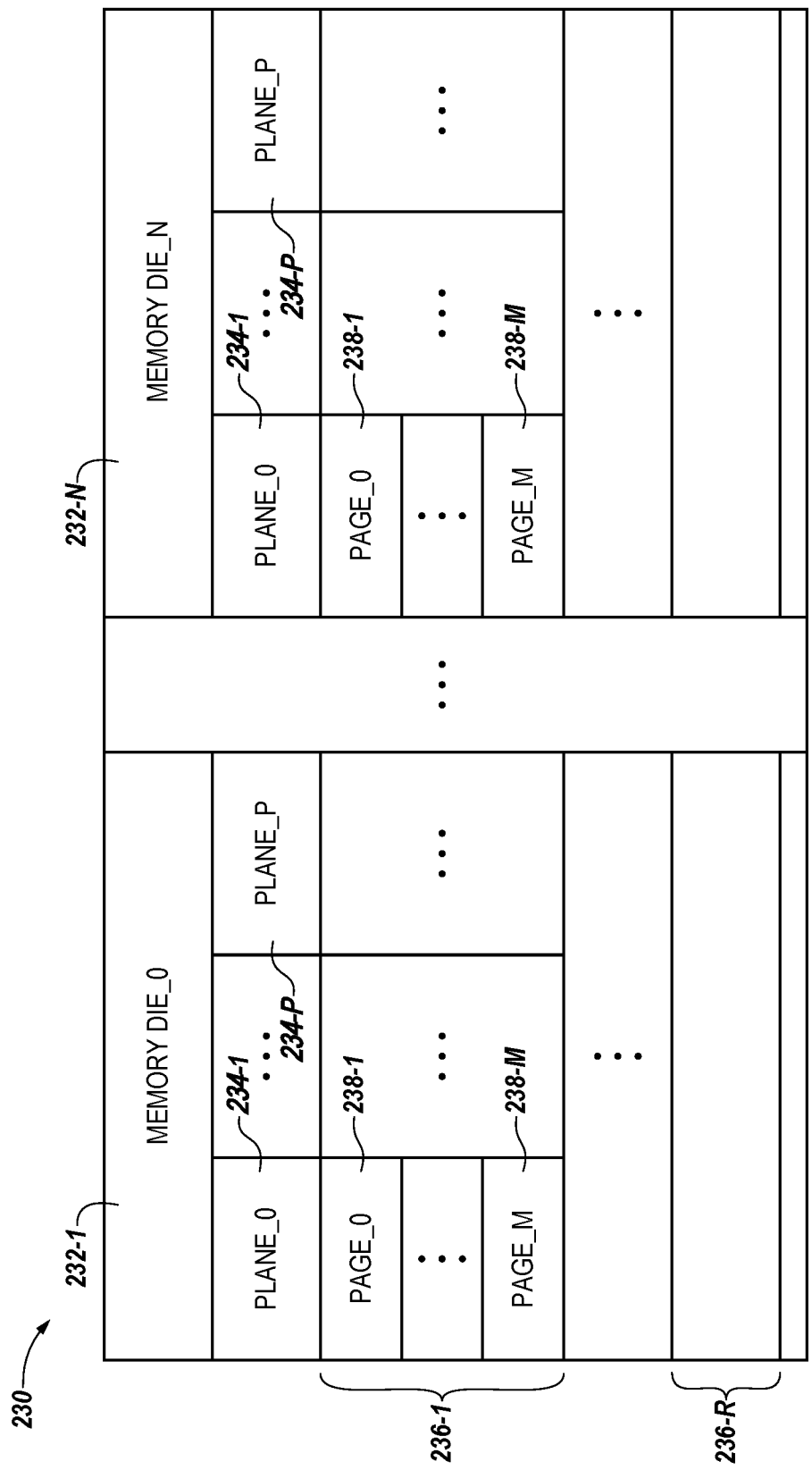
FIG. 2 illustrates an example memory device in accordance with some embodiments of the present disclosure.

FIG. 2 illustrates an example memory device 230 in accordance with some embodiments of the present disclosure. The memory device 230 can be analogous to the memory device 130 illustrated in FIG. 1, herein. Although not shown so as not obfuscate the drawings, the memory device 230 can be a non-volatile memory device 230 that includes an array of non-volatile memory cells. In some embodiments, the memory device 230 can be a NAND flash memory device (e.g., a 3-D NAND flash memory device) and/or can be deployed in a mobile computing device such as a mobile phone, laptop, IoT device, or the like.

As shown in FIG. 2, the memory device 230 can include multiple memory dice 232-1 to 232-N (e.g., the MEMORY DIE_0 to the MEMORY DIE N), which can each include multiple planes 234-1 to 234-P (e.g., the PLANE 0 to the PLANE P). A number of blocks (or sub-blocks), which can be referred to as pages 238-1 to 238-M (e.g., the PAGE_0 to the PAGE_M), can be included in each of the planes 234-1 to 234-P. That is, as shown in FIG. 2, a number of physical blocks (or sub-blocks) or pages 238-1 to 238-P can be included in a plane 234-1 to 234-P, and a number of planes 234-1 to 234-P can be included on a memory die 232-1 to 232-N.

As shown in FIG. 2, the pages 238-1 to 238-M can be included in one or more physical rows 236-1 to 236-R. The rows 236-1 to 236-R can be coupled to word lines (e.g., access lines) and can, as is appropriate given the context, be referred to as word lines 236-1 to 236-R, herein. Further, although not shown in FIG. 2, the memory cells can be coupled to sense lines (e.g., data lines and/or digit lines). As one of ordinary skill in the art will appreciate, each row 236-1 to 236-R can include a number of pages of memory cells (e.g., physical pages). A physical page refers to a unit of programming and/or sensing (e.g., a number of memory cells that are programmed and/or sensed together as a functional group). In some embodiments, each row 236-1 to 236-R comprises one physical page of memory cells. However, embodiments of the present disclosure are not so limited. For instance, in some embodiments, each row 236-1 to 236-R can include multiple physical pages 238-1 to 238-M of memory cells (e.g., one or more even pages of memory cells coupled to even-numbered word lines and/or bit lines, and one or more odd pages of memory cells coupled to odd numbered word lines and/or bit lines). Additionally, for embodiments including multilevel cells, a physical page 238-1 to 238-M of memory cells can store multiple logical pages of data (e.g., an upper page of data and a lower page of data, with each cell in a physical page storing one or more bits towards an upper page of data and one or more bits towards a lower page of data).

Although not explicitly shown in FIG. 2, a row 236-1 to 236-R of memory cells can comprise a number of physical sectors (e.g., subsets of memory cells). Each physical sector of cells can store a number of logical sectors of data. Additionally, each logical sector of data can correspond to a portion of a particular page of data. As an example, one logical sector of data stored in a particular physical sector can correspond to a logical sector corresponding to one page (e.g., the page 238-1) of data, and the other logical sector of data stored in the particular physical sector can correspond to the other page (e.g., the page 238-M) of data. Each physical sector can store system data, user data, and/or overhead data, such as error correction code (ECC) data, LBA data, and/or metadata.

Figure 3:
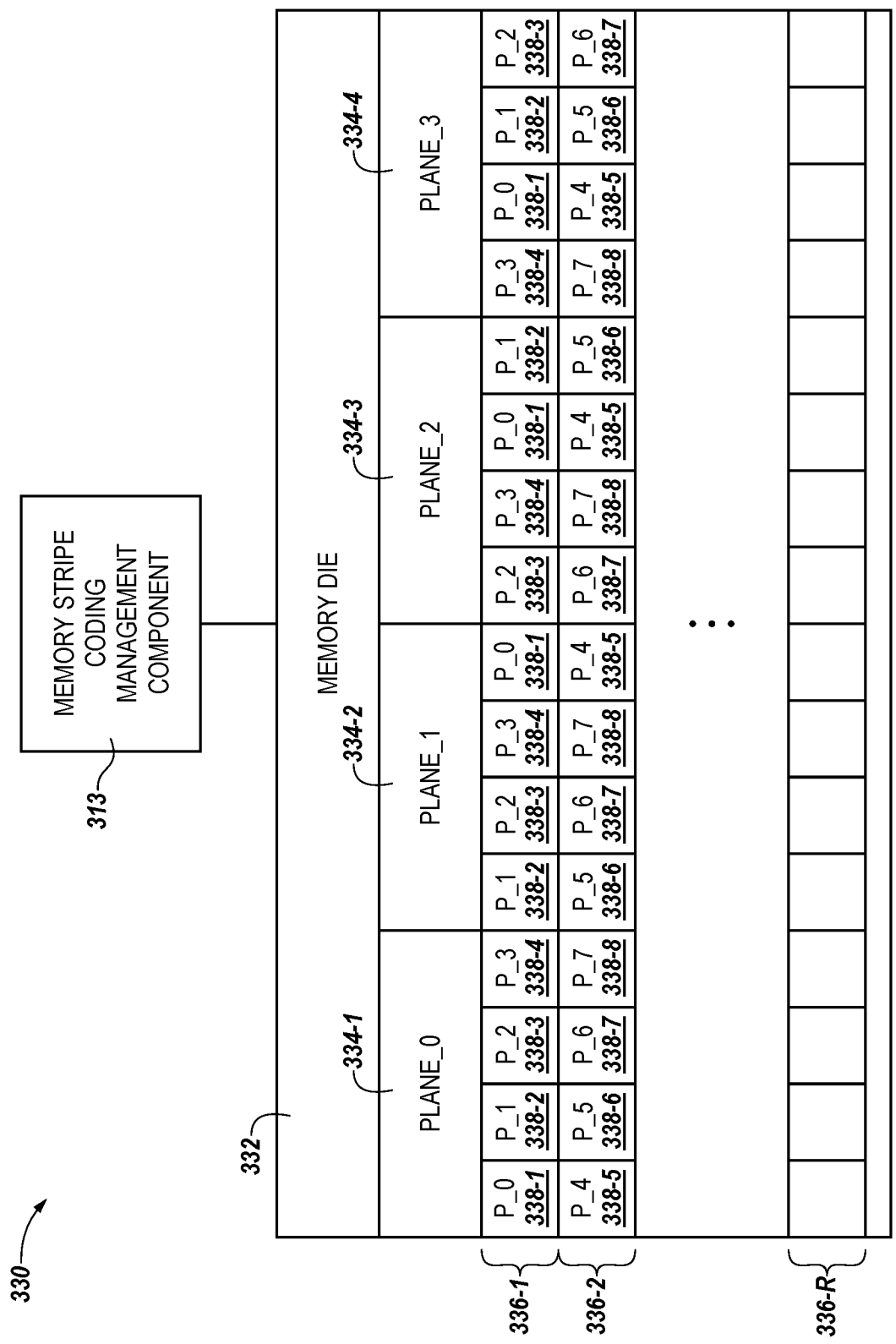
FIG. 3 illustrates an example memory device and memory stripe coding management component in accordance with some embodiments of the present disclosure.

FIG. 3 illustrates an example memory device 330 and memory stripe coding management component 313 in accordance with some embodiments of the present disclosure. The memory stripe coding management component 313 can be analogous to the memory stripe coding management component 113 illustrated in FIG. 1 and the memory device 330 can be analogous to the memory device 130 illustrated in FIG. 1 and/or the memory device 230 illustrated in FIG. 2. In some embodiments, the memory device 330 and/or the memory stripe coding management component 313 can be deployed in a mobile computing device, such as a smartphone, laptop computer, IoT device, or the like.

As shown in FIG. 3, the memory device 330 includes a memory die 332, which can be analogous to one of the memory dice 232-1 to 232-N illustrated in FIG. 2. The memory die 332 can include multiple memory planes (PLANE_0 334-1, PLANE_1 334-2, PLANE_3 334-3, PLANE_4 334-4, etc.), which can be analogous to the memory planes 234-1 to 234-N illustrated in FIG. 2. Each of the planes 334-1 to 334-4 can include one or more memory pages (e.g., the pages 238-1 to 238-M illustrated in FIG. 2, herein) that can include a page of data (P_0 338-1, P_1 338-2, P_2 338-3, P_3 338-4, P_4 338-5, P_5 338-6, P_6 338-7, P_7 338-8, etc.). The pages of data 338-1 to 338-8 can include parity data (e.g., RAIN parity data) that can be used in a data recovery operation such as a RAIN recovery operation.

Pages of the memory device (e.g., the pages 238-1 to 238-M illustrated in FIG. 2, herein) can include data and be referred to as pages of data 338-1 to 338-8. The pages of data 338-1 to 338-8 can be included in one or more physical rows 336-1 to 336-R, which can be analogous to the physical rows 236-1 to 236-R illustrated in FIG. 2, herein. As described above, the rows 336-1 to 336-R can be coupled to word lines (e.g., access lines) and can, as is appropriate given the context, be referred to as word lines 336-1 to 336-R, herein.

In a non-limiting example, the memory stripe coding management component 313 can cause a first page of data (e.g., the page of data P_0 338-1) corresponding to a data recovery operation to be written to a plane 334-1 of a memory device 330. The memory stripe coding management component 313 can cause a second page of data (e.g., the page of data P_1 338-2) corresponding to a data recovery operation to be written to a different plane 334-2 of the memory device 330. In some embodiments, a relative physical location of the first page of data P_0 338-1 with respect to the plane 334-1 and a relative physical location of the second page of data P_1 338-2 with respect to the plane 334-2 are a same relative physical location with respect to a memory die 332 on which the plane 334-1 and the second 334-2 are located. Similarly, a relative physical location of the page of data P_4 338-5 with respect to the plane 334-1 and a relative physical location of the second page of data P_5 338-6 with respect to the plane 334-2 are a same relative physical location with respect to a memory die 332 on which the plane 334-1 and the second 334-2 are located, and so forth.

For example, in contrast to approaches in which each page of data is written to a same relative physical location with respect to the planes 334-1, 334-2, 334-3, and 334-4, the first page of data P_0 338-1 is located in a first position of a word line 336-1 with respect to the plane 334-1 and the second page of data P_1 338-2 is located in a first position of the word line 336-1 with respect to the plane 334-1. By writing the pages of data 338-1 to 338-8 in the manner illustrated in FIG. 3, both multi-page and multi-plane failures can be recovered without utilizing additional cache (e.g., SRAM) resources than are generally used to protect merely against multi-page failures or merely against multi-plane failures.

In some embodiments, the first page of data P_0 338-1 and the second page of data P_1 338-2 can be collocated on a single memory stripe (e.g., the word line 336-1) that invokes at least one memory die 332 of the memory device 330. Continuing with the above example, the first page of data P_0 338-1 and the second page of data P_1 338-2 can be part of a redundant array of independent NAND (RAIN) stripe written to the memory device 330. Accordingly, the first page of data P_0 338-1 and the second page of data P_1 338-2 can contain data corresponding to a parity portion of RAIN stripe written to the memory device 330.

The memory stripe coding management component 313 can cause a third page of data (e.g., the page of data P_7 338-8) corresponding to the data recovery operation to be written to a different plane (e.g., the plane 334-3) of the memory device 330 and cause a fourth page of data (e.g., the page of data P_4 338-5) corresponding to the data recovery operation to be written to yet another plane (e.g., the plane 334-4) of the memory device 330. A relative physical location of the page of data P_7 338-8 with respect to the plane 334-3 and a relative physical location of the page of data P_4 338-5 with respect to the plane 334-4 can be a same relative physical location with respect to the memory die 332 on which the plane 334-3 and the plane 334-4 are located. In some embodiments, the page of data P_7 338-8 and the page of data 338-5 are written to a redundant array of independent NAND (RAIN) stripe (e.g., the word line 336-2 that is different than a RAIN stripe (e.g., the word line or row 336-1) to which the first page (e.g., the page of data 338-1) and the second page (e.g., the page of data 338-2) are written.

In some embodiments, the memory stripe coding management component 313 can cause performance of the data recovery operation using the first page of data (e.g., the page of data P_0 338-1) or the second page of data (e.g., the page of data P_1 338-2), or both. The memory stripe coding management component 313 can cause performance of the data recovery operation responsive to a determination that that a failure involving host data written to the memory device 330 has occurred. The data recovery operation can be, for example, a RAIN recovery operation to recover host data having uncorrectable errors associated therewith.

In another non-limiting example, a memory sub-system (e.g., the memory sub-system 110 illustrated in FIG. 1, herein) can include a plurality of memory planes 334-1, 334-2, 334-3, 334-4, etc. Each of the memory planes can include one or more sub-sets of memory blocks (e.g., the pages 238-1 to 238-M illustrated in FIG. 2, herein) that are physically arranged such that a first sub-set of memory blocks within a first memory plane is located in a same physical position within the first memory plane as a first sub-set of memory blocks with a second memory plane. A processing device (e.g., the memory stripe coding management component 313) can perform operations that include writing first data (e.g., a page of data such as the pages of data 338-1 to 338-8) comprising a first portion of a redundant array of independent NAND (RAIN) stripe to the first sub-set of memory blocks and writing second data (e.g., a page of data such as the pages of data 338-1 to 338-8) comprising a second portion of the RAIN stripe to the second sub-set of memory blocks.

In some embodiments, the memory sub-system further includes a third sub-set of memory blocks within the first memory plane and a fourth sub-set of memory blocks within the second memory plane. The processing device can further perform operations including writing third data comprising a first portion of a different RAIN stripe to the third sub-set of memory blocks and/or writing fourth data comprising a second portion of the different RAIN stripe to the fourth sub-set of memory blocks. As shown in FIG. 3, the third sub-set of memory blocks can be located in a same physical position within the first memory plane as the fourth sub-set of memory blocks is located within the second memory plane.

Continuing with this example, in some embodiments, the processing device further perform operations including causing performance of a data recovery operation using the first data or the second data, or both. For example, the processing device can further perform operations including causing performance of a data recovery operation responsive to a determination that that a failure involving host data written to the plurality of sub-sets of memory blocks has occurred.

Figure 4:
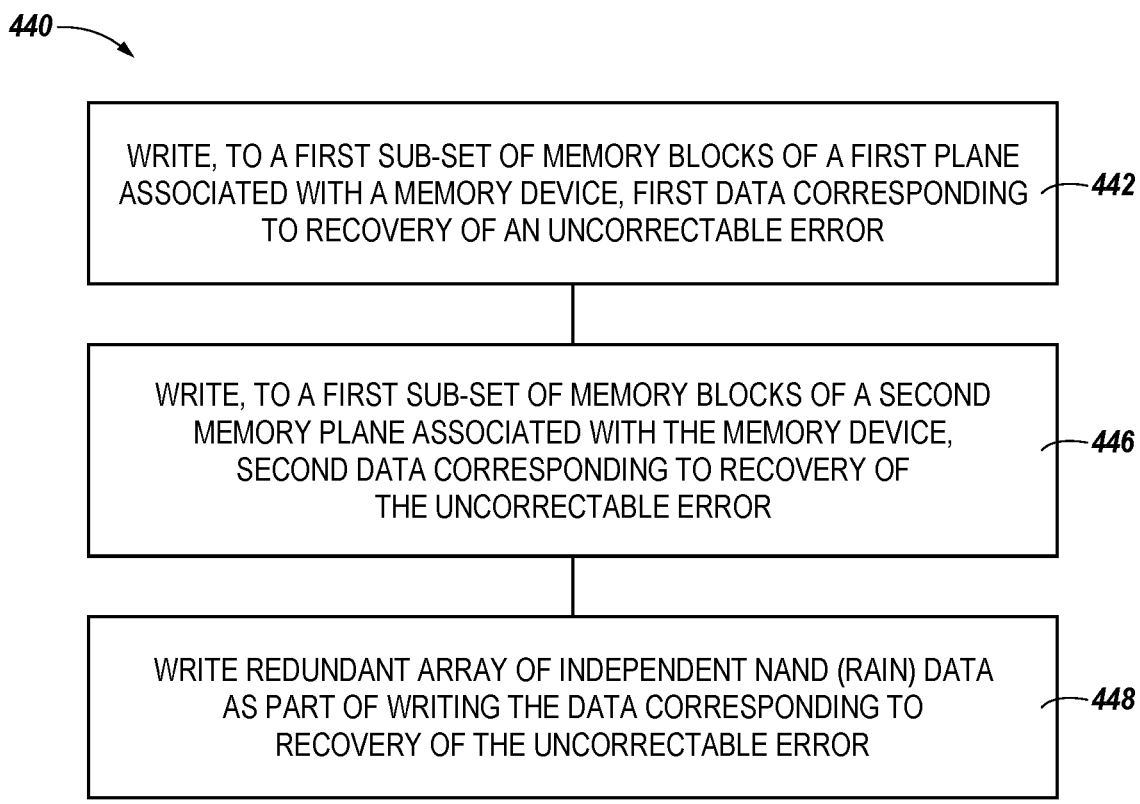
FIG. 4 is a flow diagram corresponding to a method for memory stripe coding management in accordance with some embodiments of the present disclosure.

FIG. 4 is a flow diagram corresponding to a method for memory stripe coding management in accordance with some embodiments of the present disclosure. The method 440 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 440 is performed by the memory stripe coding management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 442, data (e.g., a page of data 338-1 to 338-8 illustrated in FIG. 3, herein) corresponding to recovery of an uncorrectable error can be written to a sub-set of memory blocks (e.g., the block 238-1 to 238-M illustrated in FIG. 2, herein) of a memory plane (e.g., the panes 334-1 to 334-4 illustrated in FIG. 3, herein) associated with a memory device (e.g., the memory device 330 illustrated in FIG. 3, herein).

At operation 446, different data corresponding to recovery of the uncorrectable error can be written to a sub-set of memory blocks of a different memory plane associated with the memory device. In some embodiments, a relative physical location of the sub-set of memory blocks of the first memory plane and a relative physical location of the sub-set of memory blocks of the second memory plane are a same relative physical location with respect to the first memory plane and the second memory plane.

At operation 448, redundant array of independent NAND (RAIN) data can be written as part of writing the data corresponding to recovery of the uncorrectable error. In some embodiments, a first portion of redundant array of independent NAND (RAIN) parity data or a second portion of RAIN parity data, or both can be written as part of writing the data corresponding to recovery of the uncorrectable error.

In some embodiments, the first memory plane and the second memory plane are configured to store a portion of a first redundant array of independent NAND (RAIN) stripe and an operation to write third data corresponding to recovery of a different uncorrectable error to a first sub-set of memory blocks of a third plane associated with a memory device and/or an operation to write second data corresponding to recovery of the different uncorrectable error to a first sub-set of memory blocks of a fourth memory plane associated with the memory device can be performed. As described above, a relative physical location of the first sub-set of memory blocks of the third memory plane and a relative physical location of the first sub-set of memory blocks of the fourth memory plane are a same relative physical location with respect to the third memory plane and the fourth memory plane. In some embodiments, the third memory plane and the fourth memory plane are configured to store a portion of a second RAIN stripe.

As described above, a further operation to perform a data recovery operation using the first data or the second data, or both can be performed by, for example, a processing device, such as the memory stripe coding management component 113 illustrated in FIG. 1, herein. In some embodiments, the data recovery operation can be performed in response to a determination that a failure involving host data written to the memory device has occurred.

Figure 5:
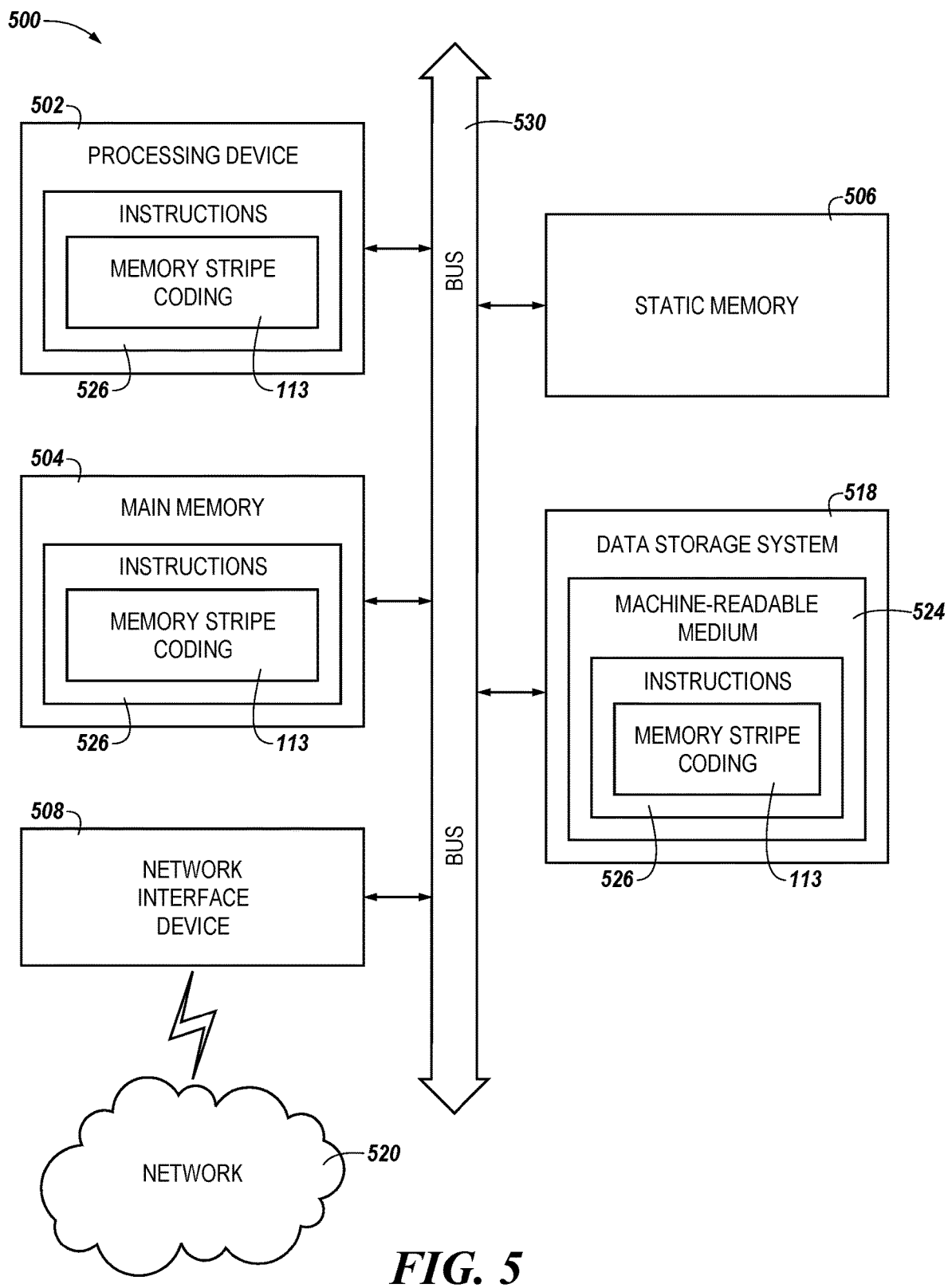
FIG. 5 is a block diagram of an example computer system in which embodiments of the present disclosure may operate.

FIG. 5 is a block diagram of an example computer system 500 in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the memory stripe coding management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a memory stripe coding management component (e.g., the memory stripe coding management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
    writing, to a first sub-set of memory blocks of a first memory plane associated with a memory device, first data corresponding to recovery of an uncorrectable error;
    writing, to a first sub-set of memory blocks of a second memory plane associated with the memory device, second data corresponding to recovery of the uncorrectable error, wherein:

a relative physical location of the first sub-set of memory blocks of the first memory plane and a relative physical location of the first sub-set of memory blocks of the second memory plane are a same relative physical location with respect to the first memory plane and the second memory plane, and the first memory plane and the second memory plane are configured to store a portion of a first redundant array of independent NAND (RAIN) stripe and wherein the method further comprises:

writing, to a first sub-set of memory blocks of a third memory plane associated with the memory device, third data corresponding to recovery of a different uncorrectable error; and writing, to a first sub-set of memory blocks of a fourth memory plane associated with the memory device, second data corresponding to recovery of the different uncorrectable error, wherein:

a relative physical location of the first sub-set of memory blocks of the third memory plane and a relative physical location of the first sub-set of memory blocks of the fourth memory plane are a same relative physical location with respect to the third memory plane and the fourth memory plane, and the third memory plane and the fourth memory plane are configured to store a portion of a second RAIN stripe.

2. The method of claim 1, further comprising writing redundant array of independent NAND (RAIN) data as part of writing the data corresponding to recovery of the uncorrectable error.

3. The method of claim 1, further comprising writing a first portion of redundant array of independent NAND (RAIN) parity data as part of writing the first data or writing a second portion of RAIN parity data as part of writing the second data, or both.

4. The method of claim 1, further comprising performing a data recovery operation using the first data or the second data, or both.

5. The method of claim 4, further comprising performing the data recovery operation in response to a determination that a failure involving host data written to the memory device has occurred.

6. An apparatus, comprising:
a memory stripe coding management component comprising a processor configured to:
cause a first page of data corresponding to a data recovery operation to be written to a first plane of a memory device;
cause a second page of data corresponding to a data recovery operation to be written to a second plane of the memory device, wherein
a relative physical location of the first page with respect to the first plane and a relative physical location of the second page with respect to the second plane are a same relative physical location with respect to a memory die on which the first plane and the second plane are located,
cause a third page of data corresponding to the data recovery operation to be written to a third plane of the memory device; and
cause a fourth page of data corresponding to the data recovery operation to be written to a fourth plane of the memory device, wherein:

a relative physical location of the third page with respect to the third plane and a relative physical location of the fourth page with respect to the fourth plane are a same relative physical location with respect to the memory die on which the third plane and the fourth plane are located, and wherein the third page and the fourth page are written to a redundant array of independent NAND (RAIN) stripe that is different than a RAIN stripe to which the first page and the second page are written.

7. The apparatus of claim 6, wherein the first page and the second page are part of a redundant array of independent NAND (RAIN) stripe written to the memory device.

8. The apparatus of claim 6, wherein the first page of the data and the second page of the data contain data corresponding to a parity portion of a redundant array of independent NAND (RAIN) stripe written to the memory device.

9. The apparatus of claim 6, wherein the first page of data and the second page of data are collocated on a single memory stripe that invokes at least one memory die of the memory device.

10. The apparatus of claim 6, wherein the memory stripe coding management component is further to cause performance of the data recovery operation using the first page of data or the second page of data, or both.

11. The apparatus of claim 6, wherein the memory stripe coding management component is further to cause performance of the data recovery operation responsive to a determination that that a failure involving host data written to the memory device has occurred.

12. The apparatus of claim 6, wherein the memory stripe coding management component is deployed in a mobile computing device.

13. A system, comprising:
a memory sub-system that includes a plurality of memory planes, each of the memory planes comprising a plurality of sub-sets of memory blocks that are physically arranged such that:
a first sub-set of memory blocks within a first memory plane is located in a same physical position within the first memory plane as a first sub-set of memory blocks within a second memory plane; and
a third sub-set of memory blocks within the first memory plane is located in a same physical position within the first memory plane as a fourth sub-set of memory blocks within the second memory plane; and
a processor coupled to the memory device, the processor to perform operations comprising:
writing first data comprising a first portion of a redundant array of independent NAND (RAIN) stripe to the first sub-set of memory blocks within the first memory plane;
writing second data comprising a second portion of the RAIN stripe to the first sub-set of memory blocks within the second memory plane;
writing third data comprising a first portion of a different RAIN stripe to the third sub-set of memory blocks; and
writing fourth data comprising a second portion of the different RAIN stripe to the fourth sub-set of memory blocks, wherein the third data and the fourth data are written to a RAIN stripe that is different than the RAIN stripe to which the first data and the second data are written.

14. The system of claim 13, wherein the third sub-set of memory blocks is located in a same physical position within the first memory plane as the fourth sub-set of memory blocks is located within the second memory plane.

15. The system of claim 13, wherein the processor is to further perform operations comprising causing performance of a data recovery operation using the first data or the second data, or both.

16. The system of claim 13, wherein the processor is to further perform operations comprising causing performance of a data recovery operation responsive to a determination that that a failure involving host data written to the plurality of sub-sets of memory blocks has occurred.

17. The system of claim 13, wherein the system comprises a mobile computing device.

* * * * *